United States Patent
Sasaki

(10) Patent No.: US 7,173,792 B2
(45) Date of Patent: Feb. 6, 2007

(54) THIN-FILM MAGNETIC HEAD HAVING A COOLING LAYER FORMED COPLANAR WITH A LOWER POLE AND FROM THE SAME MATERIAL AS THE LOWER POLE

(75) Inventor: Yoshitaka Sasaki, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 386 days.

(21) Appl. No.: 10/773,376

(22) Filed: Feb. 9, 2004

(65) Prior Publication Data

US 2005/0174685 A1   Aug. 11, 2005

(51) Int. Cl.
    *G11B 5/40* (2006.01)
    *G11B 5/17* (2006.01)

(52) U.S. Cl. ...................... 360/126; 360/123
(58) Field of Classification Search .............. None
See application file for complete search history.

(56) References Cited

U.S. PATENT DOCUMENTS

| | | | | |
|---|---|---|---|---|
| 6,396,660 B1 * | 5/2002 | Jensen et al. | | 360/126 |
| 6,466,404 B1 * | 10/2002 | Crue et al. | | 360/126 |
| 6,731,461 B2 * | 5/2004 | Yamada et al. | | 360/126 |
| 6,914,750 B2 * | 7/2005 | Garfunkel et al. | | 360/234.3 |
| 6,963,470 B2 * | 11/2005 | Sato | | 360/126 |
| 6,963,474 B2 * | 11/2005 | Yoshida et al. | | 360/317 |
| 2002/0067571 A1 * | 6/2002 | Yoshida et al. | | 360/126 |
| 2003/0223156 A1 * | 12/2003 | Yuito et al. | | 360/317 |
| 2004/0218306 A1 * | 11/2004 | Sato et al. | | 360/123 |
| 2004/0246629 A1 * | 12/2004 | Sato | | 360/317 |
| 2004/0246630 A1 * | 12/2004 | Otomo | | 360/317 |
| 2005/0047015 A1 * | 3/2005 | Matono et al. | | 360/126 |
| 2005/0225897 A1 * | 10/2005 | Liu et al. | | 360/126 |
| 2006/0103982 A1 * | 5/2006 | Nakamoto et al. | | 360/126 |

FOREIGN PATENT DOCUMENTS

| | | |
|---|---|---|
| JP | A 2003-91802 | 3/2003 |
| JP | 2005-78706 A * | 3/2006 |
| WO | WO 02/063614 A1 | 8/2002 |

* cited by examiner

Primary Examiner—Jefferson Evans
(74) Attorney, Agent, or Firm—Oliff & Berridge, PLC

(57) ABSTRACT

A write head incorporates a bottom pole layer, a top pole layer, a coupling section, a write gap layer, a thin-film coil and a cooling layer. The coupling section is disposed away from the air bearing surface and magnetically couples the bottom pole layer to the top pole layer. The write gap layer is provided between the pole portions of the bottom pole layer and the top pole layer. The thin-film coil is provided between the bottom pole layer and the top pole layer and insulated from the bottom pole layer and the top pole layer. The bottom pole layer and the cooling layer are disposed in one plane. The cooling layer is located farther from the air bearing surface than the bottom pole layer. The bottom pole layer and the cooling layer are separated with a gap.

6 Claims, 11 Drawing Sheets

THIN-FILM MAGNETIC HEAD HAVING A COOLING LAYER FORMED COPLANAR WITH A LOWER POLE AND FROM THE SAME MATERIAL AS THE LOWER POLE

BACKGROUND OF THE INVENTION

1. Field of the Invention

The present invention relates to a thin-film magnetic head having at least an induction-type electromagnetic transducer.

2. Description of the Related Art

Recent years have seen significant improvements in the areal recording densities of hard disk drives. In particular, the areal recording densities of the latest hard disk drives have reached 100 to 160 gigabytes per platter and are even exceeding that level. It is required to improve the performance of thin-film magnetic heads, accordingly.

Among the thin-film magnetic heads, widely used are composite thin-film magnetic heads made of a layered structure including a recording (write) head having an induction-type electromagnetic transducer for writing and a reproducing (read) head having a magnetoresistive element (that may be hereinafter called an MR element) for reading.

Typically, the write head incorporates: a bottom pole layer and a top pole layer that are magnetically coupled to each other and include magnetic pole portions opposed to each other and located in regions of the pole layers on a side of a medium facing surface (an air bearing surface) that faces toward a recording medium; a write gap layer provided between the magnetic pole portions of the top and bottom pole layers; and a thin-film coil at least part of which is disposed between the top and bottom pole layers and insulated from the top and bottom pole layers.

Typically, the read head has a structure in which the MR element is disposed between a bottom shield layer and a top shield layer.

A flying-type thin-film magnetic head used in a hard disk drive, for example, is typically made up of a slider having a thin-film magnetic head element formed in the trailing edge. The slider is slightly lifted above the surface of a recording medium by means of an air flow generated by rotation of the medium. To improve the areal recording density of the hard disk drive, it is required to reduce the height at which the slider flies. The distance between the thin-film magnetic head element and the surface of the recording medium is about 5 to 8 nanometers (nm), for example, when the slider is flying.

If the height at which the slider flies is reduced, it is likely that the slider collides with the recording medium, and the head element or the medium thereby suffers damage. Moreover, in the write head, the pole layers expand because of the heat generated by the thin-film coil and the medium-facing-surface-side ends of the pole layers protrude in some cases. Such protrusion of the pole layers increases the occurrences of the collision of the slider with the recording medium.

In composite magnetic heads, the bottom pole layer is located closer to the read head than the top pole layer, and the top pole layer defines the write track width. In addition, the bottom pole layer is often made greater in size than the top pole layer. In such a case, the amount of expansion of the bottom pole layer due to the heat is greater than that of the top pole layer since the bottom pole layer is greater in volume. Moreover, the bottom pole layer is located farther from the surface of the slider than the top pole layer, so that the heat of the bottom pole layer is hard to release to the outside. This is another reason that the amount of expansion of the bottom pole layer due to the heat increases. As thus described, the volume of protrusion of the bottom pole layer is likely to increase.

To reduce the amount of protrusion of the bottom pole layer, a reduction in size of the bottom pole layer is considered. However, if the bottom pole layer is reduced in size, it is difficult that the heat conveyed from the coil to the bottom pole layer is released from the bottom pole layer. As a result, the volume of expansion of the bottom pole layer due to the heat increases, and the volume of protrusion of the bottom pole layer increases, too.

If the bottom pole layer also functions as the top shield layer of the read head, a reduction in size of the bottom pole layer causes a problem that the function of shielding the MR element is reduced and the characteristic of the read head is reduced.

OBJECT AND SUMMARY OF THE INVENTION

It is an object of the invention to provide a thin-film magnetic head for suppressing the protrusion of the medium-facing-surface-side ends of the pole layers due to the heat generated by the thin-film coil.

First and second thin-film magnetic heads of the invention comprises: a medium facing surface that faces toward a recording medium; a first pole layer and a second pole layer including magnetic pole portions that are opposed to each other and located in regions of the pole layers on a side of the medium facing surface; a coupling section that is located away from the medium facing surface, includes at least one of a portion of the first pole layer and a portion of the second pole layer, and magnetically couples the first and second pole layers to each other; a gap layer provided between the pole portion of the first pole layer and the pole portion of the second pole layer; a thin-film coil wound around the coupling section, a part of the coil being disposed between the first and second pole layers and insulated from the first and second pole layers; a cooling layer for cooling the first pole layer and the thin-film coil; and a substrate. The first and second pole layers, the gap layer, the thin-film coil and the cooling layer are stacked on the substrate, and the first pole layer is located closer to the substrate than the second pole layer.

According to the first thin-film magnetic head of the invention, the first pole layer and the cooling layer are made of an identical magnetic material. Each of the first pole layer and the cooling layer has a coil facing portion that faces toward one of the surfaces of the thin-film coil closer to the substrate. The coil facing portion of the cooling layer is located farther from the medium facing surface than the coil facing portion of the first pole layer. The coil facing portion of the first pole layer is separated from the coil facing portion of the cooling layer with a gap.

The first thin-film magnetic head of the invention may further comprise a first insulating portion made of an insulating material and disposed between the first pole layer and the thin-film coil, and a second insulating portion made of an insulating material and disposed between the cooling layer and the thin-film coil. The first insulating portion may be thicker than the second insulating portion.

According to the first thin-film magnetic head of the invention, each of the first pole layer and the cooling layer may have side surfaces, and the side surfaces of the first pole layer may include: a first portion exposed from the medium facing surface; a second portion opposite to the medium facing surface; a third portion coupling an end of the first portion to an end of the second portion; and a fourth portion coupling the other end of the first portion to the other end of the second portion. A part of the side surfaces of the cooling layer may face with a specific space toward the second, third and fourth portions of the side surfaces of the first pole layer.

The first thin-film magnetic head of the invention may further comprise an insulating layer disposed between the first pole layer and the cooling layer, and the first pole layer, the cooling layer and the insulating layer may have flattened top surfaces.

The first thin-film magnetic head of the invention may further comprise two connecting portions that are disposed on both sides of the thin-film coil and connect the first pole layer to the cooling layer, and the connecting portions may be made of a magnetic material the same as the first pole layer and the cooling layer. In this case, the thin-film magnetic head may further comprise an insulating layer disposed between the first pole layer and the cooling layer, and the first pole layer, the cooling layer, the connecting portions and the insulating layer may have flattened top surfaces.

According to the first thin-film magnetic head of the invention, the cooling layer may have a greater area than the first pole layer.

The first thin-film magnetic head of the invention may further comprise a magnetoresistive element disposed near the medium facing surface, and two shield layers disposed above and below the magnetoresistive element. The magnetoresistive element and the two shield layers may be disposed between the substrate and the first pole layer.

According to the second thin-film magnetic head of the invention, the cooling layer has a thermal conductivity equal to or greater than the thermal conductivity of the first pole layer. Each of the first pole layer and the cooling layer has a coil facing portion that faces toward one of surfaces of the thin-film coil closer to the substrate. The coil facing portion of the cooling layer is located farther from the medium facing surface than the coil facing portion of the first pole layer. The coil facing portion of the first pole layer is separated from the coil facing portion of the cooling layer with a gap.

The second thin-film magnetic head of the invention may further comprise a first insulating portion made of an insulating material and disposed between the first pole layer and the thin-film coil, and a second insulating portion made of an insulating material and disposed between the cooling layer and the thin-film coil. The first insulating portion may be thicker than the second insulating portion.

According to the second thin-film magnetic head of the invention, each of the first pole layer and the cooling layer may have side surfaces, and a part of the side surfaces of the cooling layer may face with a specific space toward a portion of the side surfaces of the first pole layer, the portion being equal to or greater than a half of the side surfaces of the first pole layer.

The second thin-film magnetic head of the invention may further comprise an insulating layer disposed between the first pole layer and the cooling layer, and the first pole layer, the cooling layer and the insulating layer may have flattened top surfaces.

The second thin-film magnetic head of the invention may further comprise two connecting portions that have a thermal conductivity equal to or greater than the thermal conductivity of the first pole layer and that are disposed on both sides of the thin-film coil and connect the first pole layer to the cooling layer. In this case, the thin-film magnetic head may further comprise an insulating layer disposed between the first pole layer and the cooling layer, and the first pole layer, the cooling layer, the connecting portions and the insulating layer may have flattened top surfaces.

According to the second thin-film magnetic head of the invention, the cooling layer may have a greater area than the first pole layer.

The second thin-film magnetic head may further comprise a magnetoresistive element disposed near the medium facing surface, and two shield layers disposed above and below the magnetoresistive element. The magnetoresistive element and the two shield layers may be disposed between the substrate and the first pole layer.

According to the thin-film magnetic head of the invention, the heat generated by the thin-film coil is conveyed to the cooling layer, so that the first pole layer and the thin-film coil are cooled. According to the invention, the coil facing portion of the first pole layer is separated with a gap from the coil facing portion of the cooling layer. The volume of expansion of the first pole layer due to the heat is thereby reduced. These features of the invention suppress protrusion of the ends of the pole layers closer to the medium facing surface.

The thin-film magnetic head of the invention may further comprise the first insulating portion disposed between the first pole layer and the thin-film coil, and the second insulating portion disposed between the cooling layer and the thin-film coil. The first insulating portion may be thicker than the second insulating portion. In this case, it is likely that the heat generated by the thin-film coil is conveyed to the cooling layer rather than the first pole layer, and the first pole layer is cooled more effectively.

According to the thin-film magnetic head of the invention, the side surfaces of the first pole layer may include: the first portion exposed from the medium facing surface; the second portion opposite to the medium facing surface; the third portion coupling an end of the first portion to an end of the second portion; and the fourth portion coupling the other end of the first portion to the other end of the second portion. A part of the side surfaces of the cooling layer may face with a specific space toward the second, third and fourth portions of the side surfaces of the first pole layer. According to the thin-film magnetic head of the invention, a part of the side surfaces of the cooling layer may face with a specific space toward a portion of the side surfaces of the first pole layer, the portion being equal to or greater than a half of the side surfaces of the first pole layer. In each of these cases, the heat is easily conveyed from the first pole layer to the cooling layer, and the first pole layer is cooled more effectively.

The thin-film magnetic head of the invention may further comprise the two connecting portions that are disposed on both sides of the thin-film coil and connect the first pole layer to the cooling layer. In this case, the heat is easily conveyed from the first pole layer to the cooling layer, and the first pole layer is cooled more effectively.

According to the thin-film magnetic head of the invention, the cooling layer may have a greater area than the first pole layer. In this case, the heat quantity conveyed from the thin-film coil to the cooling layer is increased, and the heat release from the cooling layer is increased, so that the first pole layer and the thin-film coil are cooled more effectively.

The thin-film magnetic head of the invention may further comprise the magnetoresistive element disposed near the medium facing surface, and the two shield layers disposed above and below the magnetoresistive element. The magnetoresistive element and the two shield layers may be disposed between the substrate and the first pole layer. In this case, a reduction in the function of the shield layers to shield the magnetoresistive element is prevented even if the first pole layer is small.

Other and further objects, features and advantages of the invention will appear more fully from the following description.

DETAILED DESCRIPTION OF THE PREFERRED EMBODIMENTS

Embodiments of the invention will now be described in detail with reference to the accompanying drawings.

[First Embodiment]

Figure 1:
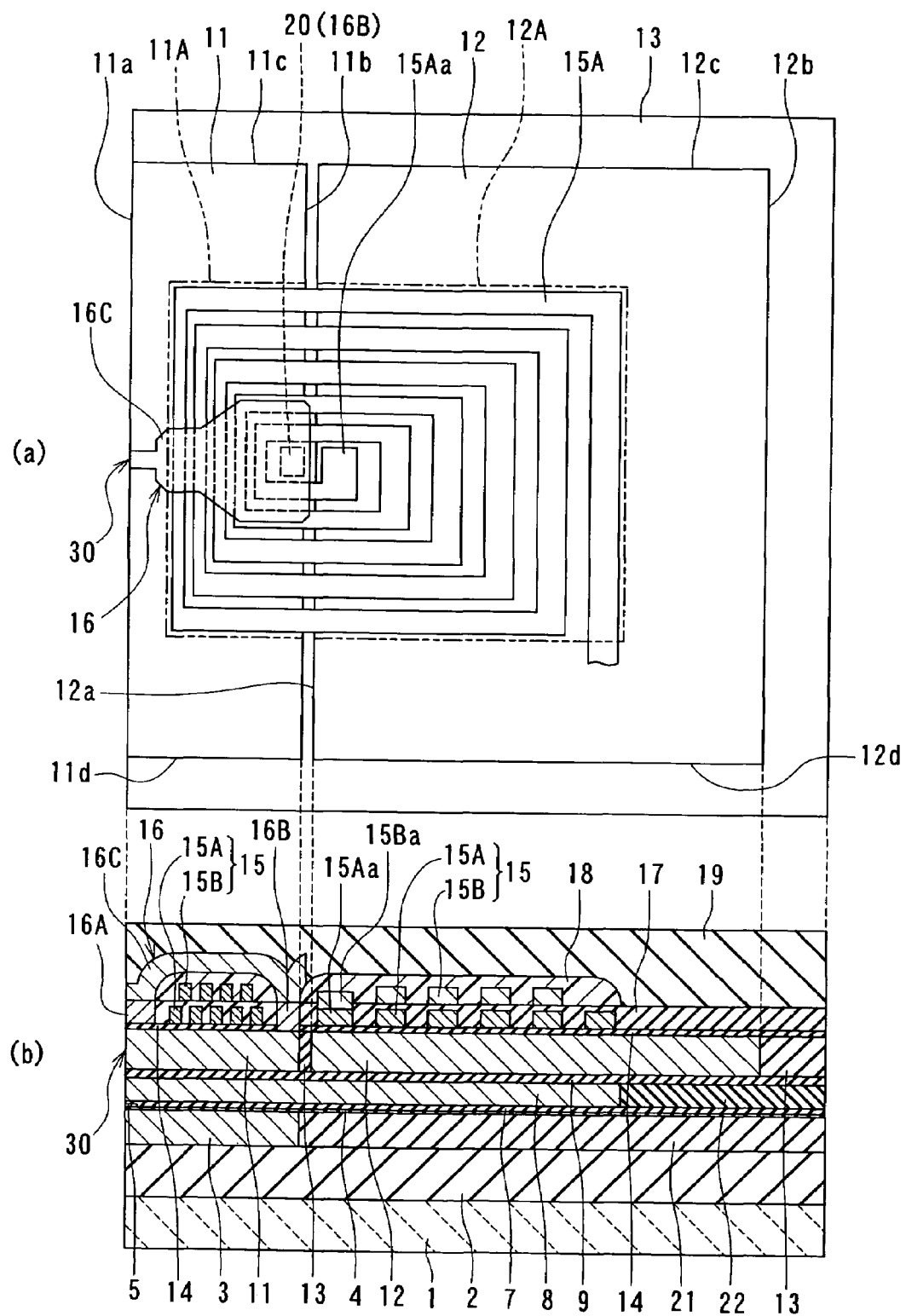
FIG. 1 illustrates a thin-film magnetic head of a first embodiment of the invention.
Figure 2:
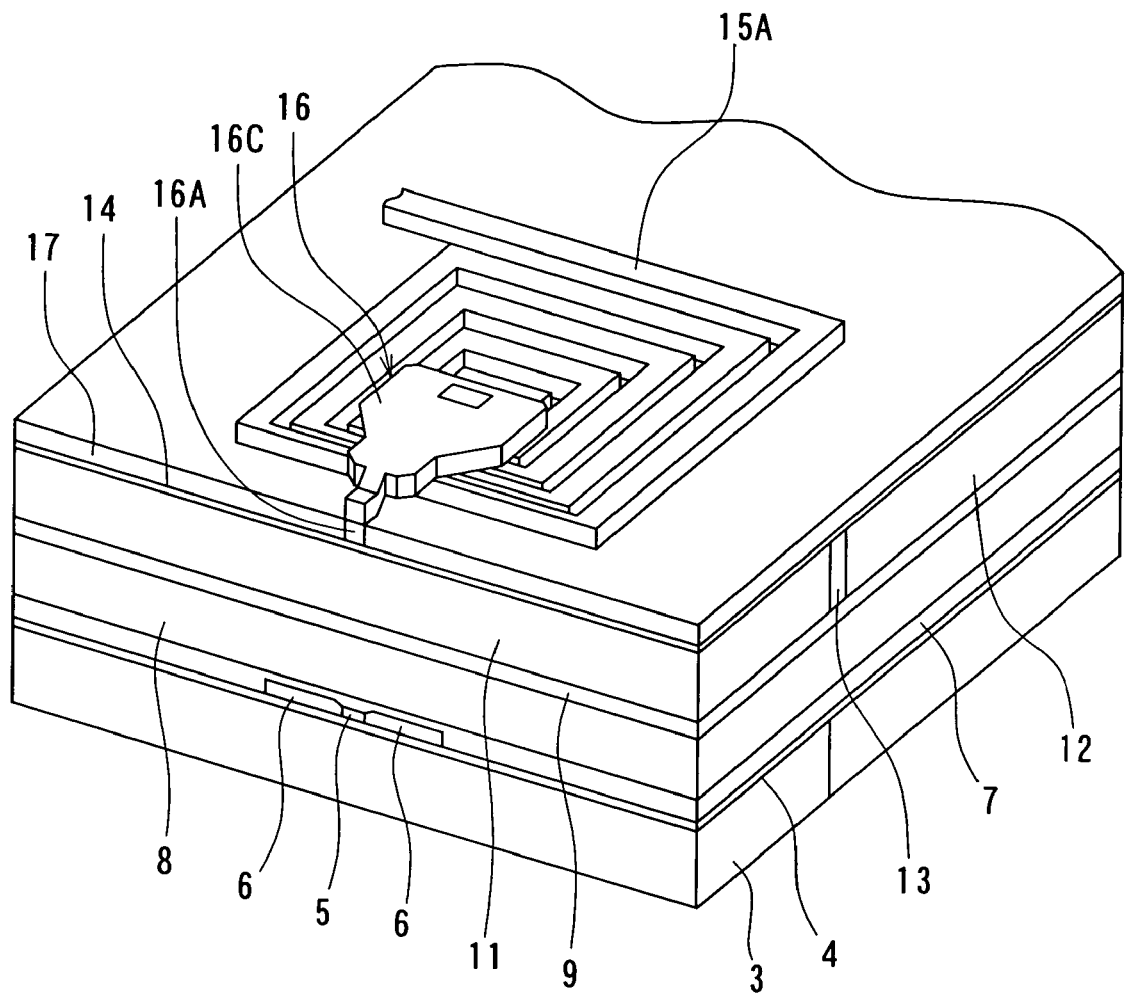
FIG. 2 is a perspective view for illustrating the main part of the thin-film magnetic head of the first embodiment.

Reference is now made to FIG. 1 and FIG. 2 to describe a method of manufacturing a thin-film magnetic head of a first embodiment of the invention. FIG. 1 illustrates the correspondence of a top view (a) of the main part of the thin-film magnetic head of the embodiment and a cross-sectional view (b) of the thin-film magnetic head of the embodiment. The cross-sectional view (b) illustrates a cross section orthogonal to the air bearing surface and the top surface of a substrate. FIG. 2 is a perspective view of the main part of the thin-film magnetic head of the embodiment.

In the method of manufacturing the thin-film magnetic head of the embodiment, an insulating layer 2 made of alumina ($Al_2O_3$), for example, is deposited to a thickness of approximately 5 micrometers (μm) on a substrate 1 made of aluminum oxide and titanium carbide ($Al_2O_3$—TiC), for example. Next, a bottom shield layer 3 for a read head, made of a magnetic material and having a thickness of 2 to 3 μm, for example, is formed by plating or sputtering on the insulating layer 2. Next, an insulating layer 21 made of alumina, for example, and having a thickness of 3 to 4 μm, for example, is formed over the entire surface. The insulating layer 21 is then polished by chemical mechanical polishing (hereinafter referred to as CMP), for example, to expose the bottom shield layer 3 and to flatten the surface.

A bottom shield gap film 4 serving as an insulating film and having a thickness of approximately 10 to 15 nm, for example, is formed on the bottom shield layer 3 and the insulating layer 21. On the bottom shield gap film 4, an MR element 5 for magnetic signal detection having a thickness of tens of nanometers is formed. For example, the MR element 5 may be formed by selectively etching an MR film formed by sputtering. The MR element 5 is located near the air bearing surface 30 as the medium facing surface that faces toward the recording medium. The MR element 5 may be an element made up of a magnetosensitive film that exhibits magnetoresistivity, such as an anisotropic magnetoresistive (AMR) element, a giant magnetoresistive (GMR) element or a tunnel magnetoresistive (TMR) element. Next, a pair of electrode layers 6 (See FIG. 2), each having a thickness of tens of nanometers, to be electrically connected to the MR element 5 are formed on the bottom shield gap film 4. A top shield gap film 7 serving as an insulating film and having a thickness of approximately 10 to 15 nm, for example, is formed on the bottom shield gap film 4 and the MR element 5. The MR element 5 is embedded in the shield gap films 4 and 7. Examples of insulating materials used for the shield gap films 4 and 7 include alumina, aluminum nitride, and diamond-like carbon (DLC). The shield gap films 4 and 7 may be formed by sputtering or chemical vapor deposition (hereinafter referred to as CVD).

Next, a top shield layer 8 for the read head, made of a magnetic material and having a thickness of approximately 1.0 to 1.5 μm, for example, is formed by plating or sputtering on the top shield gap film 7. The top shield layer 8 may be made of NiFe, CoFe or FeN. Next, an insulating layer 22 made of alumina, for example, and having a thickness of 2 to 3 μm, for example, is formed over the entire surface, and polished by CMP, for example, so that the top shield layer 8 is exposed, and the surface is flattened. An insulating layer 9 made of alumina, for example, and having a thickness of 0.1 to 0.3 μm, for example, is formed over the entire top surface of the layered structure obtained through the foregoing steps.

Next, a bottom pole layer 11 and a cooling layer 12 for the write head are formed by plating or sputtering on the insulating layer 9. Each of the bottom pole layer 11 and the cooling layer 12 is rectangular-plate-shaped. The cooling layer 12 is disposed farther from the air bearing surface 30 than the bottom pole layer 11.

Each of the bottom pole layer 11 and the cooling layer 12 has a thickness of 1.5 to 2.5 μm, for example. The bottom pole layer 11 is made of a magnetic material and may be made of NiFe, CoNiFe or FeN, for example. The cooling layer 12 may be made of the same magnetic material as the bottom pole layer 11. In this case, it is possible to form the bottom pole layer 11 and the cooling layer 12 at the same time. In addition, the cooling layer 12 has a thermal conductivity equal to that of the bottom pole layer 11.

Alternatively, the cooling layer 12 may be made of a material having a thermal conductivity equal to or greater than that of the material of the bottom pole layer 11, so that the cooling layer 12 has a thermal conductivity equal to or greater than that of the bottom pole layer 11. In this case, the cooling layer 12 may be made of either a magnetic material or a nonmagnetic material. The nonmagnetic material used for the cooling layer 12 may be Cu, for example.

The side surfaces of the bottom pole layer 11 include: a first portion 11a exposed from the air bearing surface 30; a second portion 11b opposite to the air bearing surface 30; a third portion 11c coupling an end of the first portion 11a to an end of the second portion 11b; and a fourth portion 11d coupling the other end of the first portion 11a to the other end of the second portion 11b.

The side surfaces of the cooling layer 12 include: a first portion 12a located closer to the air bearing surface 30; a second portion 12b located farther from the air bearing surface 30; a third portion 12c coupling an end of the first portion 12a to an end of the second portion 12b; and a fourth portion 12d coupling the other end of the first portion 12a to the other end of the second portion 12b.

The first portion 12a of the side surfaces of the cooling layer 12 faces toward the second portion 1b of the side surfaces of the bottom pole layer 11 with a specific space. The space between the first portion 12a of the side surfaces of the cooling layer 12 and the second portion 11b of the side surfaces of the bottom pole layer 11 preferably falls within a range of 0.2 to 0.6 μm inclusive.

The portions 11a, 11b, 12a and 12b have equal lengths. The portions 12c and 12d are longer than the portions 11c and 11d. Therefore, the cooling layer 12 has a greater area than the bottom pole layer 11.

In the following step of the method of manufacturing the thin-film magnetic head of the embodiment, an insulating layer 13 made of alumina, for example, is formed to cover the bottom pole layer 11 and the cooling layer 12 and to fill the gap between the bottom pole layer 11 and the cooling layer 12. Next, the insulating layer 13 is polished by CMP, for example, so that the bottom pole layer 11 and the cooling layer 12 are exposed and the surface is flattened.

Alternatively, it is possible that the gap between the bottom pole layer 11 and the cooling layer 12 is filled with no material.

Alternatively, the bottom pole layer 11 and the cooling layer 12 may be formed in the following method. The bottom pole layer 11 is first formed on the insulating layer 9. Next, a thin insulating film of alumina, for example, is formed on the entire surface. This insulating film deposits on the side surfaces of the bottom pole layer 11, too. Next, the cooling layer 12 is formed on the above-mentioned insulating film. The gap between the bottom pole layer 11 and the cooling layer 12 is made of the insulating film. Next, an insulating layer of alumina, for example, is formed on the entire surface. The insulating layer is then polished by CMP, for example, so that the bottom pole layer 11 and the cooling layer 12 are exposed and the surface is flattened.

In the following step of the method of manufacturing the thin-film magnetic head of the embodiment, a write gap layer 14 having a thickness of 50 to 80 nm is formed over the entire top surface of the layered structure. The write gap layer 14 may be made of an insulating material such as alumina or a nonmagnetic metal material such as Ru, NiCu, Ta, W or NiB. Next, a portion of the write gap layer 14 corresponding to a coupling section described later is selectively etched to form an opening in the write gap layer 14.

Next, a first coil 15A made of a metal such as Cu is formed by frame plating, for example, on the write gap layer 14. The first coil 15A is flat-whirl-shaped. The first coil 15A has a connecting portion 15Aa that is formed near an inner end thereof and connected to a second coil 15B described later.

Next, a pole portion layer 16A is formed on a portion of the write gap layer 14 near the air bearing surface 30, and a coupling layer 16B is formed on a portion of the bottom pole layer 11 where the opening of the write gap layer 14 is located. The pole portion layer 16A and the coupling layer 16B are made of a magnetic material, and may be formed by frame plating, for example. Each of the pole portion layer 16A and the coupling layer 16B has a thickness greater than the thickness of the first coil 15A. The pole portion layer 16A has an end located opposite to the air bearing surface 30, and this end defines the throat height of the write head. The width of the pole portion layer 16A defines the track width of the write head.

Next, an insulating layer 17 made of alumina, for example, is formed to cover the first coil 15A, the pole portion layer 16A and the coupling layer 16B and to fill the space between adjacent turns of the first coil 15A. Next, the insulating layer 17 is polished by CMP, for example, so that the pole portion layer 16A and the coupling layer 16B are exposed and the surface is flattened. Next, a portion of the insulating layer 17 located on the connecting portion 15Aa is selectively etched to form an opening in the insulating layer 17.

Next, the second coil 15B made of a metal such as Cu is formed by frame plating, for example, on the insulating layer 17. The second coil 15B is flat-whirl-shaped. However, the direction in which the turns of the second coil 15B are wound from the outer end to the inner end is opposite to the direction in which the turns of the first coil 15A are wound from the outer end to the inner end. The second coil 15B has a connecting portion 15Ba that is formed near the inner end thereof and connected to the connecting portion 15Aa of the first coil 15A through the opening of the insulating layer 17. The first coil 15A and the second coil 15B make up a thin-film coil 15 with the connecting portions 15Aa and 15Ba connected to each other.

Next, an insulating layer 18 made of photoresist, for example, is formed to cover the second coil 15B and to fill the space between adjacent ones of the turns of the second coil 15B.

Next, a yoke portion layer 16C made of a magnetic material is formed on the pole portion layer 16A, the coupling layer 16B and the insulating layer 18 by frame plating, for example. The yoke portion layer 16C magnetically couples the pole portion layer 16A to the coupling layer 16B. The pole portion layer 16A, the coupling layer 16B and the yoke portion layer 16C make up a top pole layer 16. The pole portion layer 16A makes up the pole portion of the top pole layer 16. The bottom pole layer 11 has a portion facing toward the pole portion layer 16A, the write gap layer 14 being disposed between this portion and the pole portion layer 16A. This portion is the pole portion of the bottom pole layer 11.

The coupling layer 16B makes up the coupling section 20 for magnetically coupling the bottom pole layer 11 to the top pole layer 16. The thin-film coil 15 is wound around the coupling section 20.

Next, an overcoat layer 19 made of alumina, for example, is formed so as to cover the entire top surface of the layered structure. The surface of the overcoat layer 19 is flattened, and electrode pads (not shown) are formed thereon. Finally, the slider including the foregoing layers is lapped to form the air bearing surface 30. The thin-film magnetic head including the read and write heads is thus completed.

In FIG. 1(a) the write gap layer 14, the second coil 15B, the insulating layers 17 and 18, and the overcoat layer 19 are omitted. In FIG. 2 the overcoat layer 19 is omitted.

The thin-film magnetic head according to the present embodiment comprises the air bearing surface 30 serving as a medium facing surface that faces toward a recording medium. The magnetic head further comprises the read head and the write head (the induction-type electromagnetic transducer). The read head and the write head are stacked on the substrate 1.

The read head includes: the MR element 5 located near the air bearing surface 30; the bottom shield layer 3 and the top shield layer 8 for shielding the MR element 5; the bottom shield gap film 4 located between the MR element 5 and the bottom shield layer 3; and the top shield gap film 7 located between the MR element 5 and the top shield layer 8.

The write head incorporates the bottom pole layer 11, the top pole layer 16, the coupling section 20, the write gap layer 14, the thin-film coil 15 and the cooling layer 12. The bottom pole layer 11 is located closer to the substrate 1 than the top pole layer 16. The bottom pole layer 11 and the top pole layer 16 include the pole portions that are opposed to each other and located in the regions of the pole layers on a side of the air bearing surface 30. The coupling section 20 includes the coupling layer 16B that is a part of the top pole layer 16 and located away from the air bearing surface 30. The coupling section 20 magnetically couples the bottom pole layer 11 to the top pole layer 16. The write gap layer 14 is disposed between the pole portion of the bottom pole layer 11 and the pole portion of the top pole layer 16. The thin-film coil 15 is provided between the bottom pole layer 11 and the top pole layer 16 and insulated from the bottom pole layer 11 and the top pole layer 16. The cooling layer 12 is a layer for cooling the bottom pole layer 11 and the thin-film coil 15. The bottom pole layer 11 and the top pole layer 16 correspond to the first pole layer and the second pole layer of the invention, respectively.

The bottom pole layer 11 and the cooling layer 12 are disposed in one plane, that is, on the top surface of the insulating layer 9. The cooling layer 12 has a wider area than the bottom pole layer 11. As shown in FIG. 1(a), the bottom pole layer 11 and the cooling layer 12 have coil facing portions 11A and 12A, respectively, that face toward one of the surfaces of the thin-film coil 15 closer to the substrate 1 (that is, the bottom surface of the first coil 15A). The coil facing portion 12A of the cooling layer 12 is located farther from the air bearing surface 30 than the coil facing portion 11A of the bottom pole layer 11. The coil facing portions 11A and 12A are separated by the gap made up of the insulating layer 13. The bottom pole layer 11, the cooling layer 12 and the insulating layer 13 have flattened top surfaces.

In the thin-film magnetic head of the embodiment, the heat generated by the thin-film coil 15 is conveyed to the bottom pole layer 11 and the cooling layer 12. According to the embodiment, the bottom pole layer 11 and the thin-film coil 15 are cooled by the conveyance of the heat generated by the thin-film coil 15 to the cooling layer 12. That is, an increase in temperature of the bottom pole layer 11 and the thin-film coil 15 is made smaller, compared to the case in which the cooling layer 12 is not provided, by the conveyance of the heat generated by the coil 15 to the cooling layer 12.

According to the embodiment, the coil facing portion 11A of the bottom pole layer 11 and the coil facing portion 12A of the cooling layer 12 each of which faces toward the surface of the thin-film coil 15 closer to the substrate 1 are separated from each other with the gap. Moreover, the entire bottom pole layer 11 and the entire cooling layer 12 are separated from each other with the gap, too. It is thereby possible that the volume of expansion of the bottom pole layer 11 caused by heat is made smaller, compared to the case in which the bottom pole layer has a greater area so as to face toward the entire one of the surfaces of the thin-film coil 15 closer to the substrate 1.

According to the embodiment as thus described, it is possible to suppress protrusion of one of the ends of the bottom pole layer 11 closer to the air bearing surface 30 caused by the heat generated by the thin-film coil 15.

According to the embodiment, the cooling layer 12 has a greater area than the bottom pole layer 11, so that the heat quantity conveyed from the thin-film coil 15 to the cooling layer 12 is increased and that the heat release from the cooling layer 12 is increased. As a result, the bottom pole layer 11 and the thin-film coil 15 are more effectively cooled.

Comparison is now made between the functions and effects of the thin-film magnetic head of the embodiment and those of first to fourth reference thin-film magnetic heads shown in FIG. 8 to FIG. 11. Any of the first to fourth reference thin-film magnetic heads has no cooling layer 12. FIG. 8 to FIG. 11 each illustrate the correspondence of a top view (a) of the main part of the thin-film magnetic head and a cross-sectional view (b) of the thin-film magnetic head, as FIG. 1. Numerals of the main components are only shown in FIG. 8 to FIG. 11.

Figure 8:
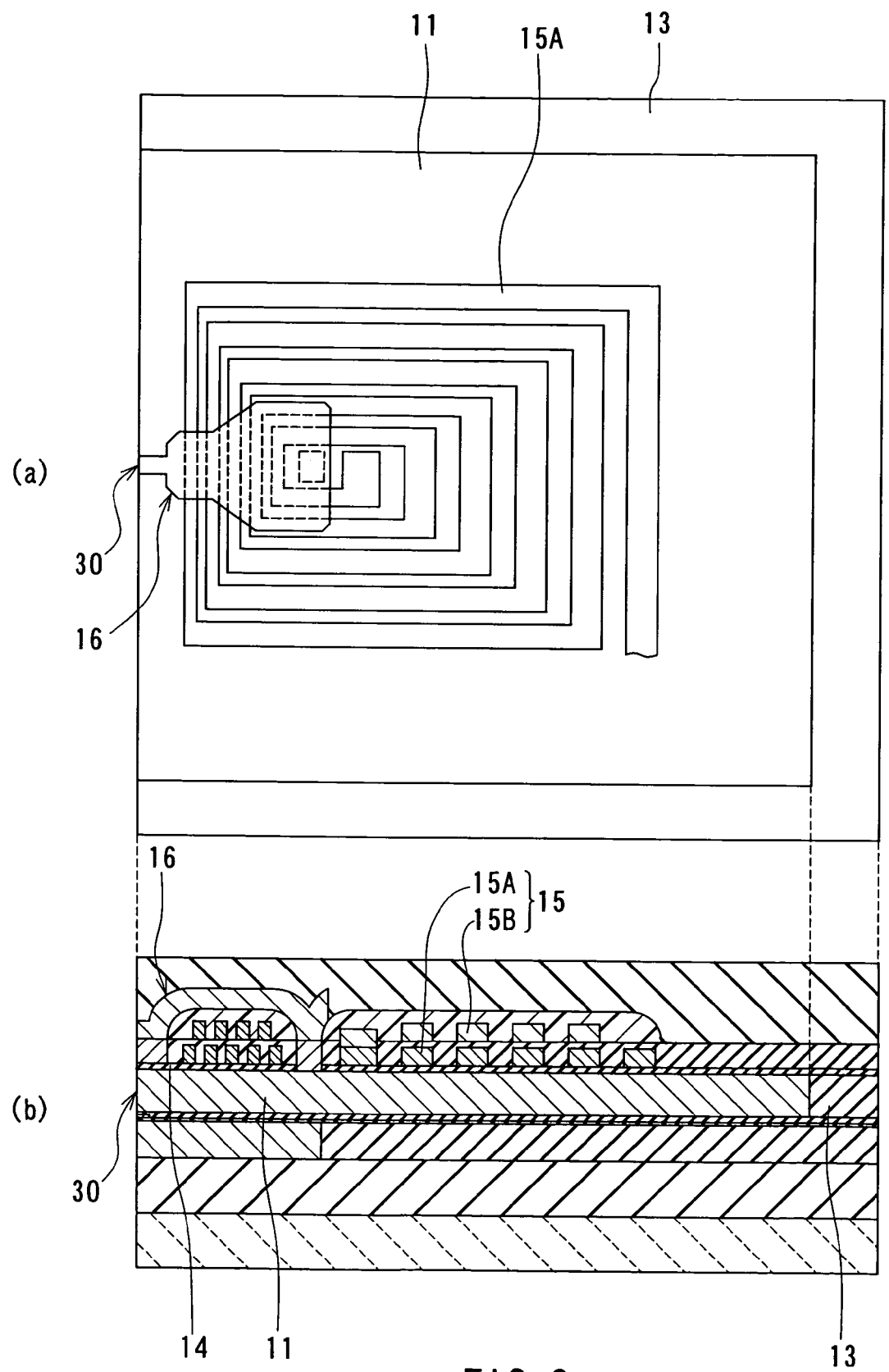
FIG. 8 illustrates a first reference thin-film magnetic head.

The first reference thin-film magnetic head shown in FIG. 8 does not comprise the top shield layer 8, the insulating layer 22, the insulating layer 9 and the cooling layer 12 of FIG. 1. The bottom pole layer 11 also functions as the top shield layer in the first reference thin-film magnetic head. The bottom pole layer 11 has a wide area so as to face toward the entire one of the surfaces of the thin-film coil 15 closer to the substrate 1 (the bottom surface of the first coil 15A). The remainder of configuration of the first reference thin-film magnetic head is the same as that of the thin-film magnetic head of the embodiment.

According to the first reference thin-film magnetic head, the bottom pole layer 11 receives a greater quantity of heat from the thin-film coil 15, and the volume of expansion of the bottom pole layer 11 due to the heat is greater, compared to the thin-film magnetic head of the embodiment. As a result, the volume of protrusion of the bottom pole layer 11 of the first reference thin-film magnetic head is greater, compared to the thin-film magnetic head of the embodiment.

Figure 9:
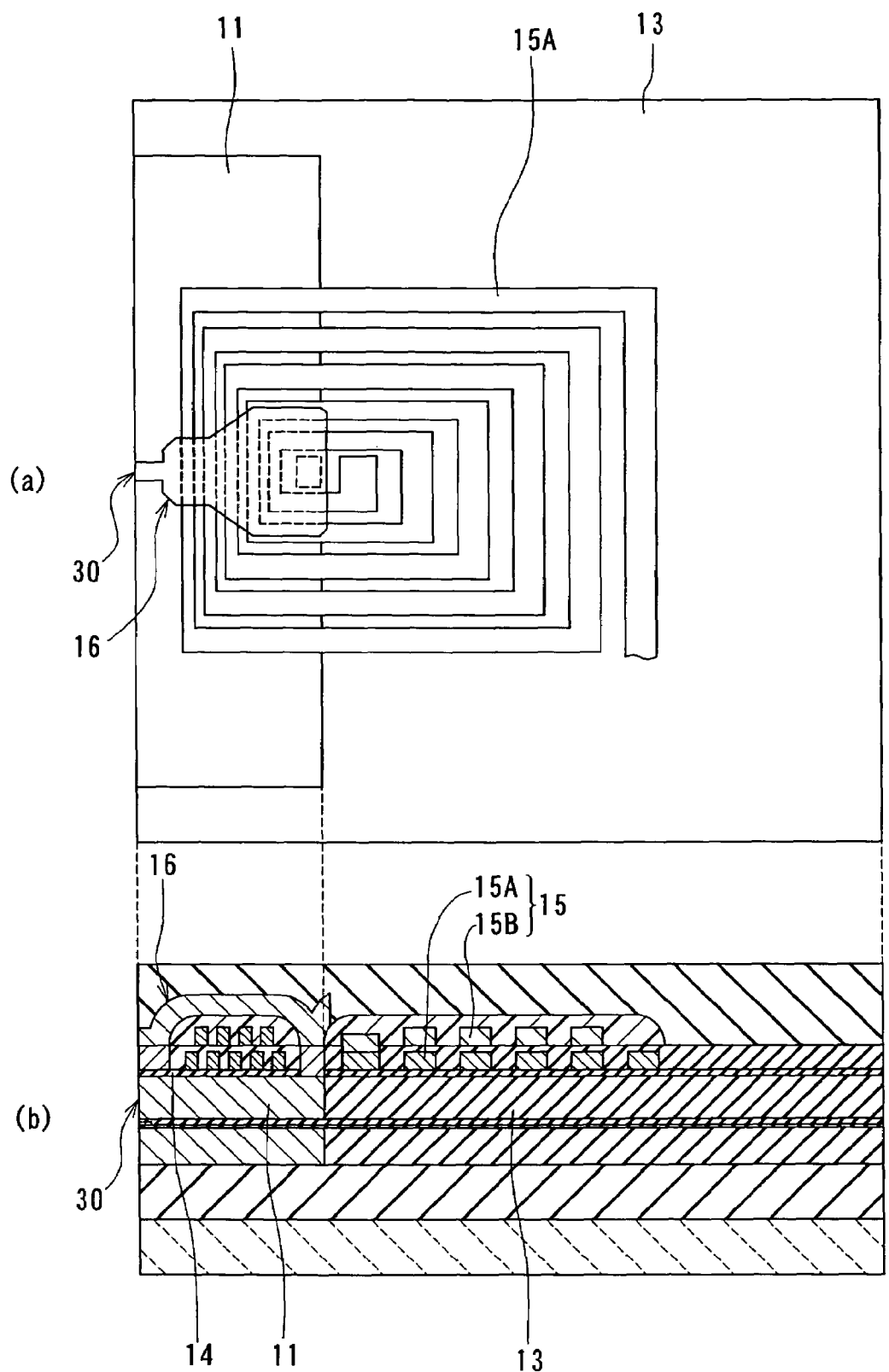
FIG. 9 illustrates a second reference thin-film magnetic head.

The second reference thin-film magnetic head shown in FIG. 9 comprises a bottom pole layer 11 smaller than the bottom pole layer 11 of the first reference thin-film magnetic head. The size and location of the bottom pole layer 11 of the second reference thin-film magnetic head are the same as those of the bottom pole layer 11 of the embodiment. The remainder of configuration of the second reference thin-film magnetic head is the same as that of the first reference thin-film magnetic head.

According to the second reference thin-film magnetic head, it is difficult that the heat conveyed from the thin-film coil 15 to the bottom pole layer 11 is released from the bottom pole layer 11, compared to the first reference thin-film magnetic head. As a result, in the second reference thin-film magnetic head, the volume of expansion of the bottom pole layer 11 due to the heat is increased, and the volume of protrusion of the bottom pole layer 11 is increased, too. Moreover, while the embodiment achieves the release of heat by means of the cooling layer 12, this is not achieved by the second reference thin-film magnetic head. Consequently, the volume of protrusion of the bottom pole layer 11 of the second reference thin-film magnetic head is greater, compared to the thin-film magnetic head of the embodiment.

According to the second reference thin-film magnetic head, the bottom pole layer 11 is smaller, compared to the first reference thin-film magnetic head, so that there arises a problem that the function of shielding the MR element 5 is reduced and the characteristics of the read head are reduced. One of the examples of reduction in the characteristics of the read head is a reduction in transfer curve of the read head.

The transfer curve of the read head is a curve indicating variations in resistance of the MR element with respect to variations in the magnetic field applied to the MR element.

Figure 3:
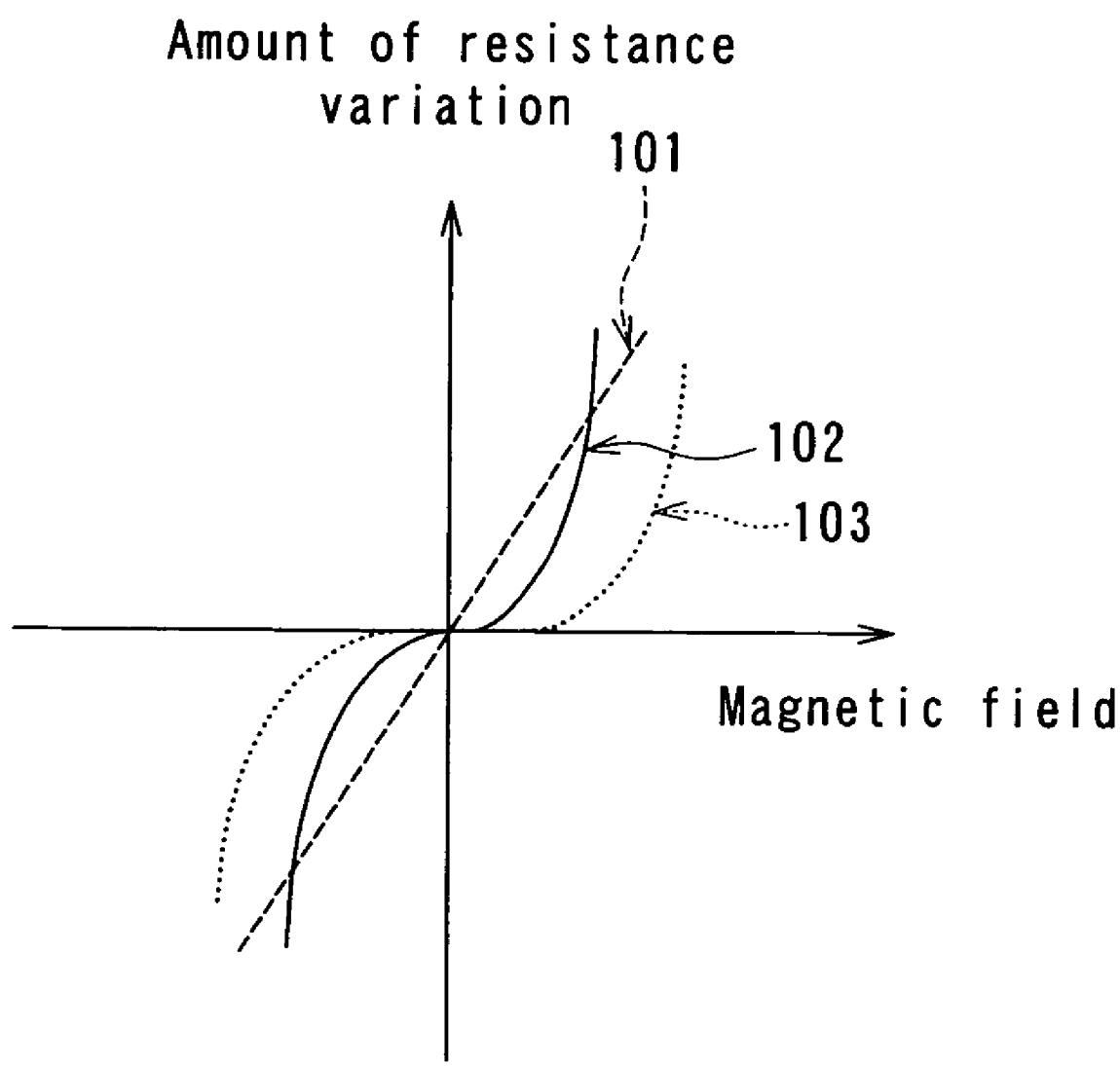
FIG. 3 is a plot for illustrating a reduction in transfer curve.

Reference is now made to FIG. 3 to briefly describe a reduction in transfer curve. FIG. 3 schematically illustrates transfer curves. In FIG. 3 the horizontal axis indicates the field applied to the MR element and the vertical axis indicates variations in resistance of the MR element. In FIG. 3 the line indicated with 101 represents an ideal transfer curve. The line indicated with 102 represents the transfer curve of a read head that is determined as a conforming product (hereinafter called a good transfer curve). The line indicated with 103 represents the transfer curve of a read head that is determined as a nonconforming product (hereinafter called a bad transfer curve). The transfer curve indicated with 103 includes a portion in which the resistance exhibits almost no variation with respect to variations in field. A reduction in transfer curve means that the transfer curve shifts from the good one indicated with 102 toward the bad one indicated with 103.

According to the first reference thin-film magnetic head, the bottom pole layer 11 that also functions as the top shield layer has a sufficiently wide area, so that a good transfer curve is likely to be achieved. However, according to the second reference thin-film magnetic head, the bottom pole layer 11 that also functions as the top shield layer has a smaller area, so that the function of the bottom pole layer 11 to shield the MR element 5 is reduced and it is likely that a bad transfer curve is obtained.

According to the embodiment of the invention, although the bottom pole layer 11 is small, the top shield layer 8 is provided besides the bottom pole layer 11. Therefore, the top shield layer 8 has a sufficiently wide area, so that a good transfer curve is obtained.

Figure 10:
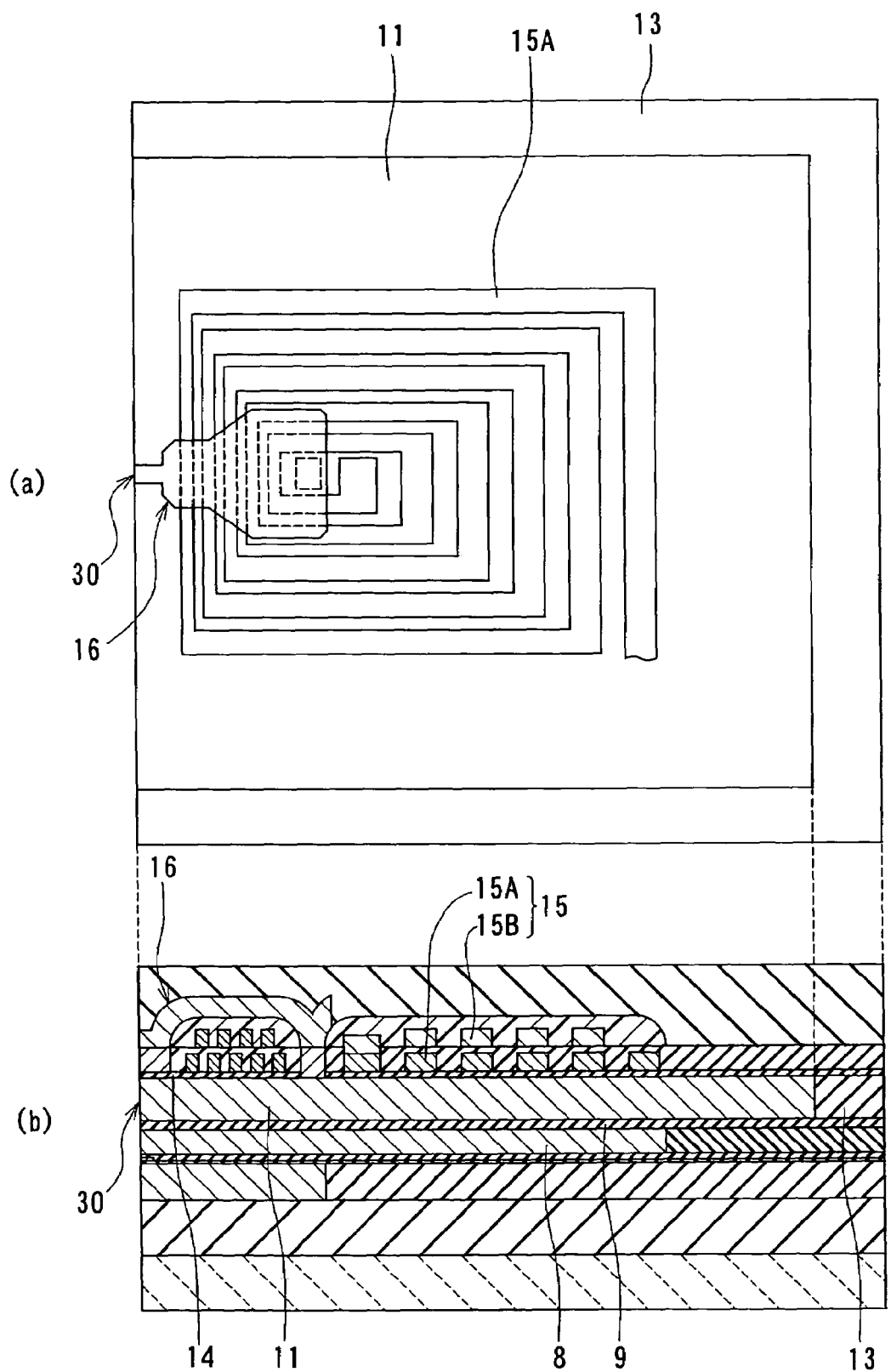
FIG. 10 illustrates a third reference thin-film magnetic head.

The third reference thin-film magnetic head shown in FIG. 10 does not comprise the cooling layer 12 of FIG. 1. The bottom pole layer 11 has a wide area so as to face toward the entire one of the surfaces of the thin-film coil 15 closer to the substrate 1 (the bottom surface of the first coil 15A). The remainder of configuration of the third reference thin-film magnetic head is the same as that of the thin-film magnetic head of the embodiment.

According to the third reference thin-film magnetic head, the bottom pole layer 11 receives a greater quantity of heat from the thin-film coil 15, and the volume of expansion of the bottom pole layer 11 due to the heat is greater, compared to the thin-film magnetic head of the embodiment. As a result, the volume of protrusion of the bottom pole layer 11 of the third reference thin-film magnetic head is greater, compared to the thin-film magnetic head of the embodiment.

Figure 11:
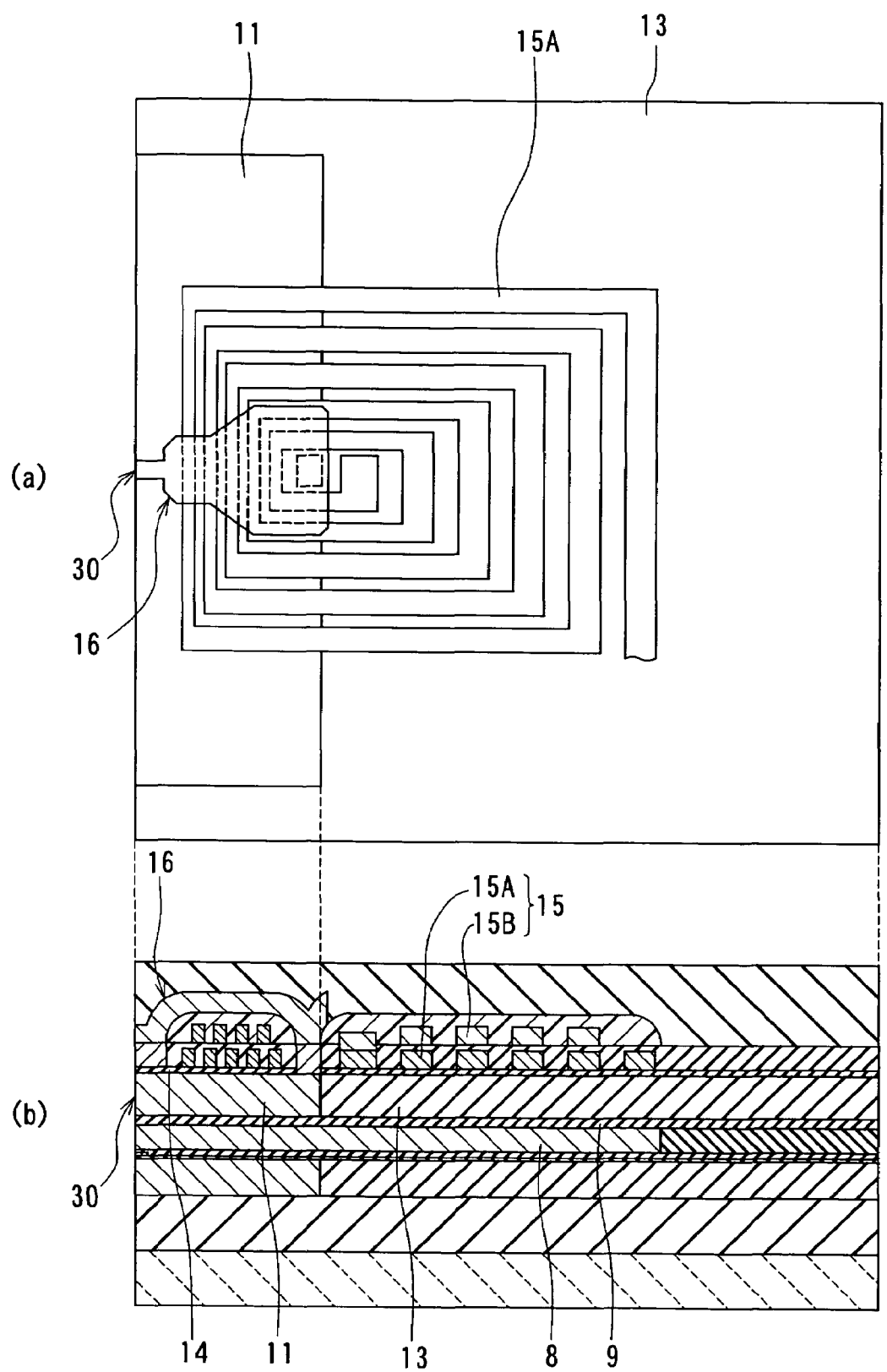
FIG. 11 illustrates a fourth reference thin-film magnetic head.

The fourth reference thin-film magnetic head shown in FIG. 11 comprises a bottom pole layer 11 smaller than the bottom pole layer 11 of the third reference thin-film magnetic head. The size and location of the bottom pole layer 11 of the fourth reference thin-film magnetic head are the same as those of the bottom pole layer 11 of the embodiment. The remainder of configuration of the fourth reference thin-film magnetic head is the same as that of the third reference thin-film magnetic head.

According to the fourth reference thin-film magnetic head, it is difficult that the heat conveyed from the thin-film coil 15 to the bottom pole layer 11 is released from the bottom pole layer 11, compared to the third reference thin-film magnetic head. As a result, in the fourth reference thin-film magnetic head, the volume of expansion of the bottom pole layer 11 due to the heat is increased, and the volume of protrusion of the bottom pole layer 11 is increased, too. Moreover, while the embodiment achieves the release of heat by means of the cooling layer 12, this is not achieved by the fourth reference thin-film magnetic head. Consequently, the volume of protrusion of the bottom pole layer 11 of the fourth reference thin-film magnetic head is greater, compared to the thin-film magnetic head of the embodiment.

According to the embodiment as thus described, it is possible to suppress protrusion of one of the ends of the bottom pole layer 11 closer to the air bearing surface 30 due to the heat generated by the coil 15 and to obtain a good transfer curve of the read head.

[Second Embodiment]

Figure 4:
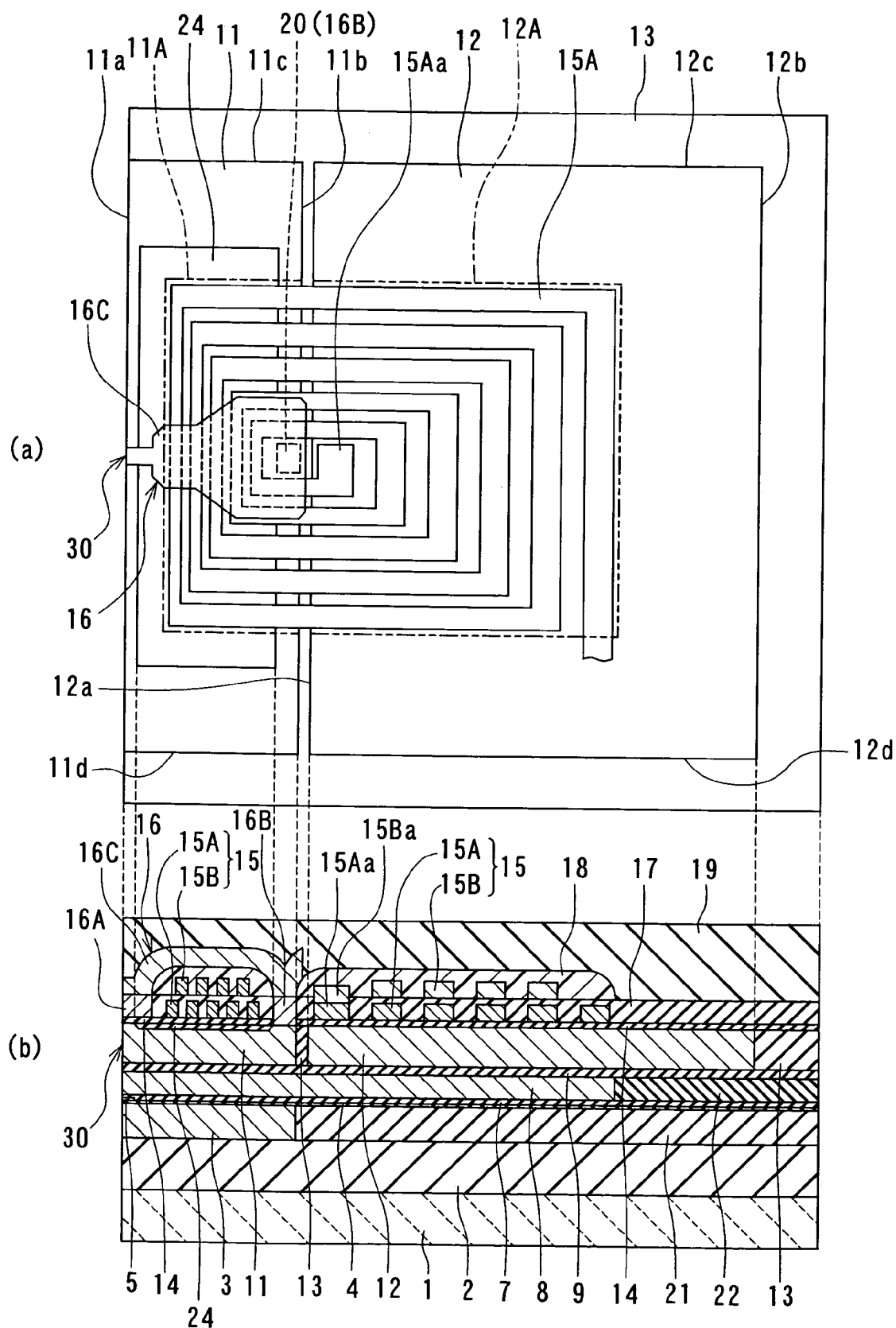
FIG. 4 illustrates a thin-film magnetic head of a second embodiment of the invention.

Reference is now made to FIG. 4 to describe a thin-film magnetic head of a second embodiment of the invention. FIG. 4 illustrates the correspondence of a top view (a) of the main part of the thin-film magnetic head of the embodiment and a cross-sectional view (b) of the thin-film magnetic head of the embodiment. The cross-sectional view (b) illustrates a cross section of the thin-film magnetic head orthogonal to the air bearing surface and the top surface of the substrate.

In the thin-film magnetic head of the second embodiment, a concave portion is formed in a region of the top surface of the bottom pole layer 11 that faces toward the surface of the thin-film coil 15 closer to the substrate 1 (the bottom surface of the first coil 15A). The insulating layer 24 is disposed in this concave portion. The bottom pole layer 11, the cooling layer 12, and the insulating layers 13 and 24 have flattened top surfaces. The remainder of configuration of the thin-film magnetic head of the second embodiment is the same as that of the first embodiment.

According to a method of manufacturing the thin-film magnetic head of the second embodiment, the bottom pole layer 11 and the cooling layer 12 are formed, and then the concave portion is formed in the top surface of the bottom pole layer 11 by etching. Next, a layer of an insulating material is formed over the entire top surface of the layered structure, and this layer is polished by CMP, for example, so that the bottom pole layer 11 and the cooling layer 12 are exposed, and the surface is flattened. The insulating layers 13 and 24 are thereby formed. The remainder of steps of the second embodiment are the same as those of the first embodiment.

According to the second embodiment, the insulating layer 24 and the write gap layer 14 are provided between the bottom pole layer 11 and the thin-film coil 15, each of the insulating layer 24 and the write gap layer 14 being made of an insulating material. On the other hand, the write gap layer 14 is only provided between the cooling layer 12 and the thin-film coil 15. Here, a portion of the insulating layer 24 and the write gap layer 14 disposed between the bottom pole layer 11 and the thin-film coil 15 is called a first insulating portion. A portion of the write gap layer 14 disposed between the cooling layer 12 and the thin-film coil 15 is called a second insulating portion. The first insulating portion is thicker than the second insulating portion. As a result, according to the second embodiment, it is more likely that the heat generated by the thin-film coil 15 is conveyed to the cooling layer 12 rather than the bottom pole layer 11, and the bottom pole layer 11 is cooled more effectively, compared to the first embodiment.

The remainder of configuration, function and effects of the second embodiment are similar to those of the first embodiment.

[Third Embodiment]

Figure 5:
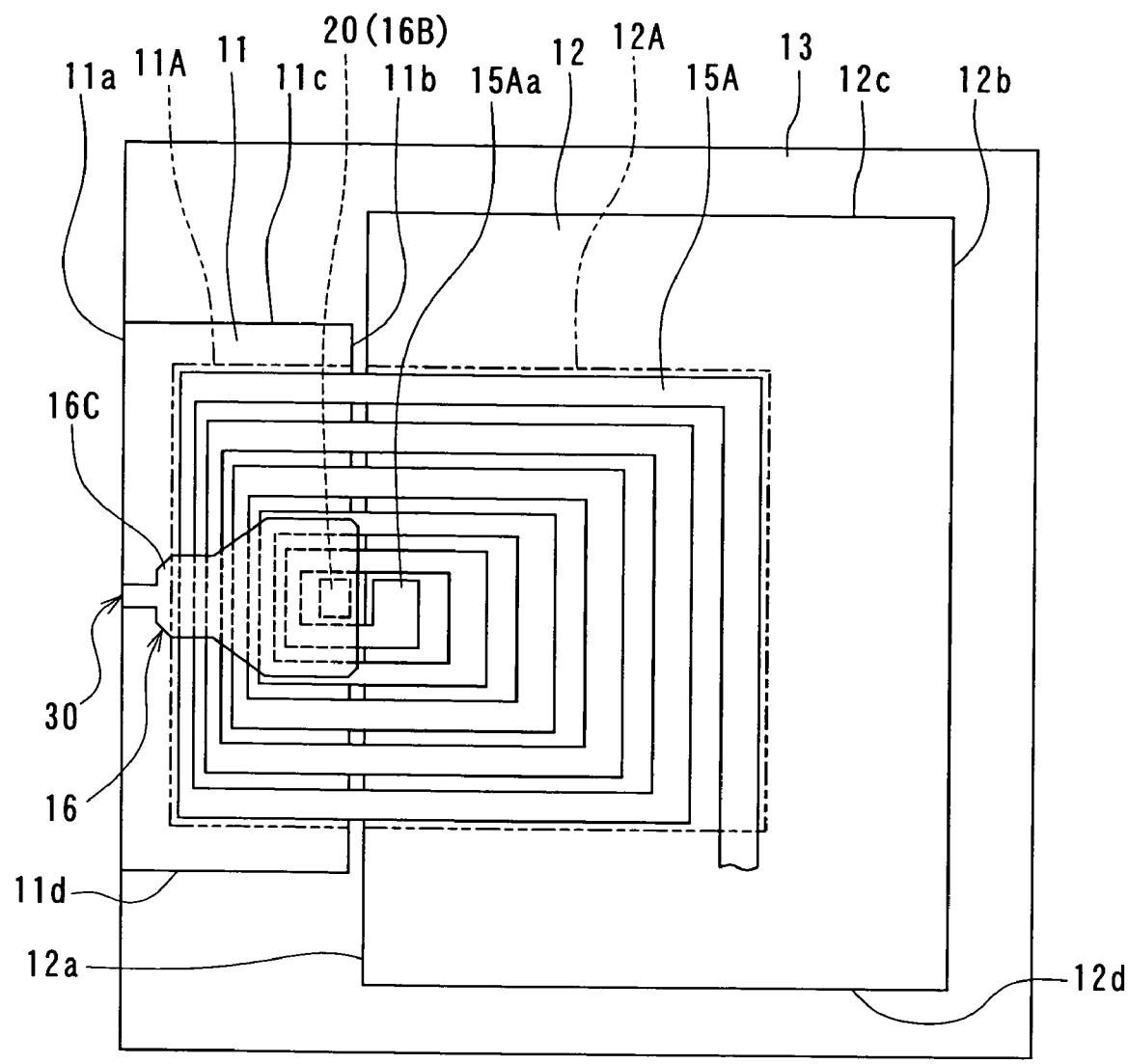
FIG. 5 is a top view for illustrating the main part of a thin-film magnetic head of a third embodiment of the invention.

Reference is now made to FIG. 5 to describe a thin-film magnetic head of a third embodiment of the invention. FIG. 5 is a top view of the main part of the thin-film magnetic head of the embodiment.

According to the thin-film magnetic head of the third embodiment, the width of the bottom pole layer 11 (the length of the portions 11a and 11b) is smaller than the width of the bottom pole layer 11 of the first embodiment. Therefore, in the third embodiment, the width of the bottom pole layer 11 is smaller than the width of the cooling layer 12 (the length of the portions 12a and 12b). As a result, according to the third embodiment, the value of [the area of the top surface of the cooling layer 12]/[the area of the top surface of the bottom pole layer 11] is greater, compared to the first embodiment. As a result, it is more likely that the heat generated by the thin-film coil 15 is conveyed to the cooling layer 12 rather than the bottom pole layer 11, and the bottom pole layer 11 is cooled more effectively, compared to the first embodiment.

In the third embodiment the insulating layer 24 may be provided as in the second embodiment. The remainder of configuration, function and effects of the third embodiment are similar to those of the first embodiment.

[Fourth Embodiment]

Figure 6:
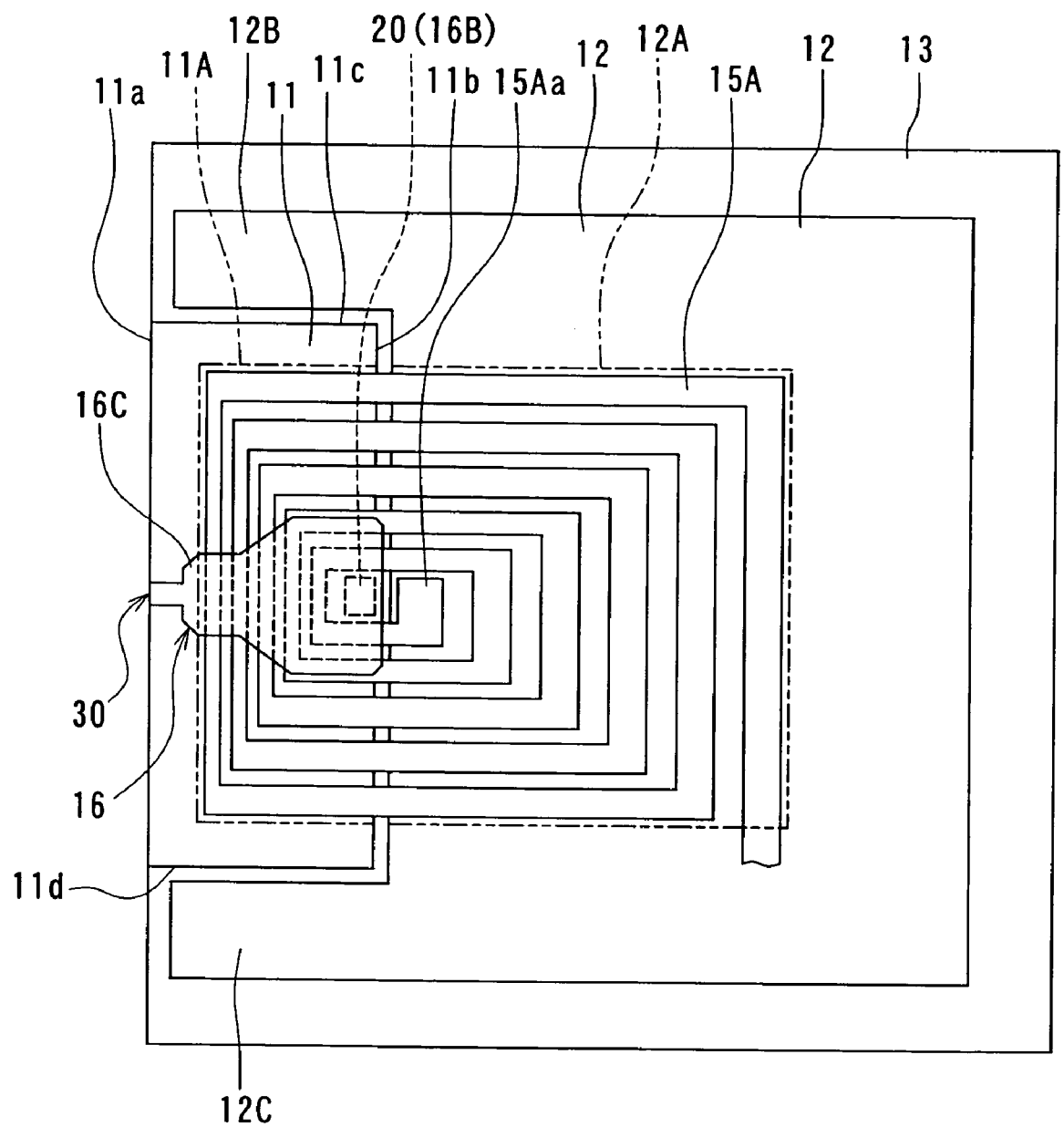
FIG. 6 is a top view for illustrating the main part of a thin-film magnetic head of a fourth embodiment of the invention.

Reference is now made to FIG. 6 to describe a thin-film magnetic head of a fourth embodiment of the invention. FIG. 6 is a top view of the main part of the thin-film magnetic head of the embodiment.

According to the thin-film magnetic head of the fourth embodiment, while the bottom pole layer 11 has a shape the same as that of the third embodiment, the cooling layer 12 has a shape different from that of the third embodiment. That is, the cooling layer 12 of the fourth embodiment is the cooling layer 12 of the third embodiment to which two overhang portions 12B and 12C are added. The overhang portions 12B and 12C are disposed at both ends of the width of the bottom pole layer 11. A part of the side surfaces of the overhang portion 12B faces toward the third portion 11c of the side surfaces of the bottom pole layer 11 with a specific space. A part of the side surfaces of the overhang portion 12C faces toward the fourth portion 11d of the side surfaces of the bottom pole layer 11 with a specific space.

In the fourth embodiment, a part of the side surfaces of the cooling layer 12 faces with a specific space toward the second portion 11b, the third portion 11c and the fourth portion 11d of the side surfaces of the bottom pole layer 11. In the fourth embodiment, a part of the side surfaces of the cooling layer 12 faces with a specific space toward a portion of the side surfaces of the bottom pole layer 11, the portion being equal to or greater than a half of the side surfaces of the bottom pole layer 11. According to the fourth embodiment, the areas of the side surface of the bottom pole layer 11 and the side surface of the cooling layer 12 that face toward each other are greater, compared to the third embodiment. As a result, it is more likely that the heat is conveyed from the bottom pole layer 11 to the cooling layer 12, and the bottom pole layer 11 is cooled more effectively, compared to the third embodiment.

In the fourth embodiment, the insulating layer 24 may be provided as in the second embodiment. The remainder of configuration, function and effects of the fourth embodiment are similar to those of the third embodiment.

[Fifth Embodiment]

Figure 7:
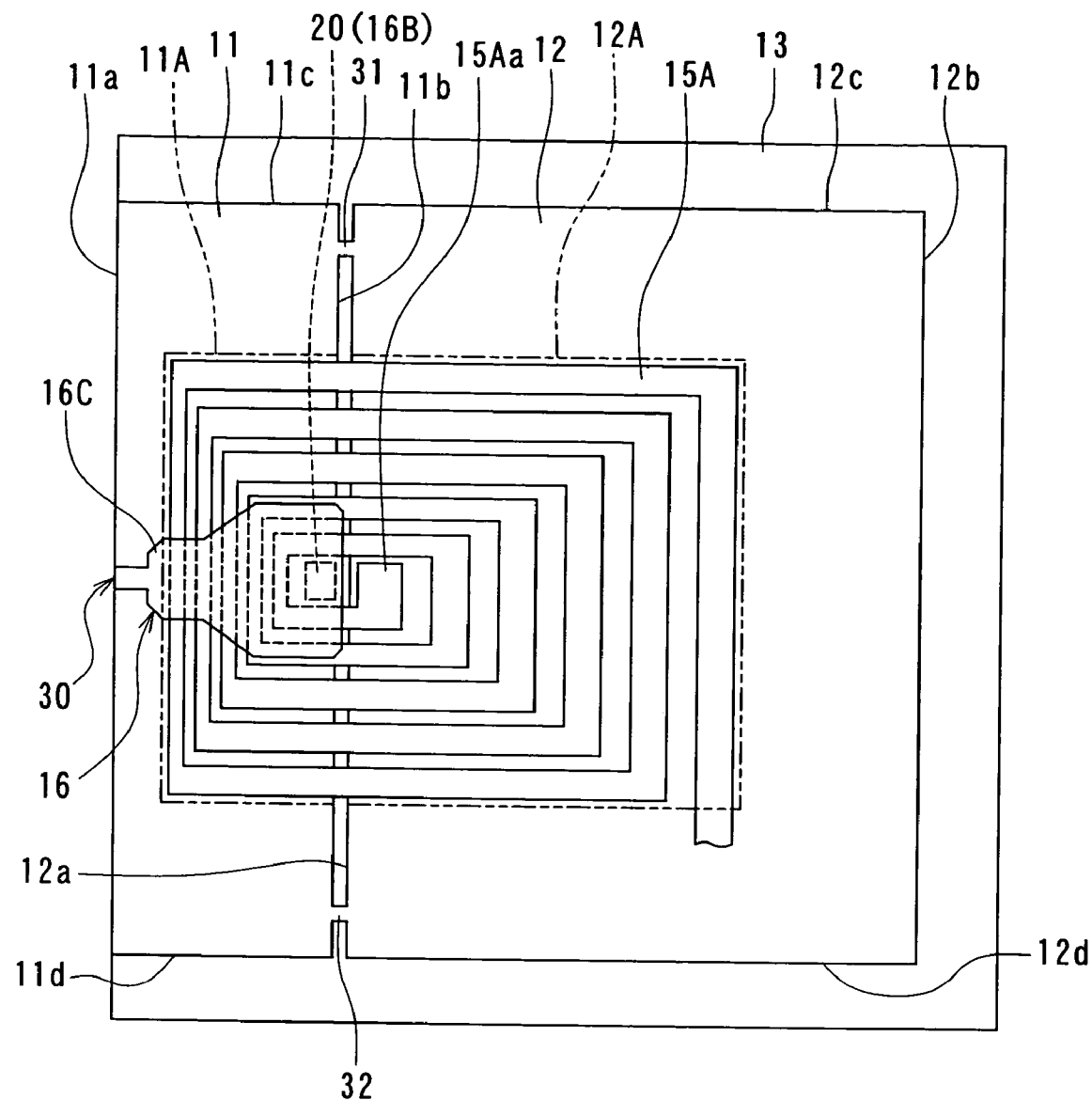
FIG. 7 is a top view for illustrating the main part of a thin-film magnetic head of a fifth embodiment of the invention.

Reference is now made to FIG. 7 to describe a thin-film magnetic head of a fifth embodiment of the invention. FIG. 7 is a top view of the main part of the thin-film magnetic head of the embodiment.

The thin-film magnetic head of the fifth embodiment comprises two connecting portions 31 and 32 that are provided on both sides of the thin-film coil 15 and connect the bottom pole layer 11 to the cooling layer 12. The connecting portions 31 and 32 and the cooling layer 12 may be made of a magnetic material the same as that of the bottom pole layer 11. In this case, it is possible to form the bottom pole layer 11, the cooling layer 12, and the connecting portions 31 and 32 at the same time. In addition, the thermal conductivity of the cooling layer 12 and the connecting portions 31 and 32 is equal to that of the bottom pole layer 11.

The connecting portions 31 and 32 may be made of a material having a thermal conductivity equal to or greater than that of the material of the bottom pole layer 11, so that the connecting portions 31 and 32 have a thermal conductivity equal to or greater than that of the bottom pole layer 11. In this case, the connecting portions 31 and 32 may be made of either a magnetic material or a nonmagnetic material. The nonmagnetic material used for the connecting portions 31 and 32 may be Cu, for example.

The bottom pole layer 11, the cooling layer 12, and the connecting portions 31 and 32 are disposed in one plane, that is, on the top surface of the insulating layer 9. The bottom pole layer 11, the cooling layer 12, the connecting portions 31 and 32, and the insulating layer 13 have flattened top surfaces.

According to the fifth embodiment, it is more likely that the heat is conveyed from the bottom pole layer 11 to the cooling layer 12 by means of the connecting portions 31 and 32, and the bottom pole layer 11 is cooled more effectively.

In the fifth embodiment, the bottom pole layer 11 is connected to the cooling layer 12 by the connecting portions 31 and 32 while the side surface of the bottom pole layer 11 is separated from the side surface of the cooling layer 12 with a gap in the region between the connecting portions 31 and 32. Since the connecting portions 31 and 32 are disposed in the region that does not face toward the thin-film coil 15, the volume of expansion of the bottom pole layer 11 and the cooling layer 12 due to the heat is small in the region near the connecting portions 31 and 32. Therefore, it is possible to suppress protrusion of one of the ends of the bottom pole layer 11 closer to the air bearing surface 30 although the bottom pole layer 11 is connected to the cooling layer 12 by the connecting portions 31 and 32.

In the fifth embodiment, too, the insulating layer 24 may be provided as in the second embodiment. The remainder of configuration, function and effects of the fifth embodiment are similar to those of the first embodiment.

The invention is not limited to the foregoing embodiments but may be practiced in still other ways. For example, the invention is applicable to a thin-film magnetic head in which the bottom pole layer also functions as the top shield layer. If the cooling layer is made of a magnetic material in this structure, the cooling layer has the function of the top shield layer, too, so that a reduction in the function of shielding the MR element is prevented.

Although the foregoing embodiments disclose the examples in which the thin-film coil 15 is made up of the two layers, the thin-film coil may be made up of a single layer or three layers or more, according to the invention.

The invention is applicable to a thin-film magnetic head that is dedicated to writing and incorporates an induction-type electromagnetic transducer only, and to a thin-film magnetic head that performs reading and writing through the use of an induction-type electromagnetic transducer.

Obviously many modifications and variations of the present invention are possible in the light of the above teachings. It is therefore to be understood that within the scope of the appended claims the invention may be practiced otherwise than as specifically described.

What is claimed is:

1. A thin-film magnetic head comprising:
   a medium facing surface that faces toward a recording medium;
   a first pole layer and a second pole layer including magnetic pole portions that are opposed to each other and located in regions of the pole layers on a side of the medium facing surface;
   a coupling section that is located away from the medium facing surface, includes at least one of a portion of the first pole layer and a portion of the second pole layer, and magnetically couples the first and second pole layers to each other;
   a gap layer provided between the pole portion of the first pole layer and the pole portion of the second pole layer;
   a thin-film coil wound around the coupling section, a part of the coil being disposed between the first and second pole layers and insulated from the first and second pole layers;
   a cooling layer for cooling the first pole layer and the thin-film coil; and a substrate, wherein:
   the first and second pole layers, the gap layer, the thin-film coil and the cooling layer are stacked on the substrate, and the first pole layer is located closer to the substrate than the second pole layer;
   the first pole layer and the cooling layer are made of an identical magnetic material;
   each of the first pole layer and the cooling layer has a coil facing portion that faces toward one of surfaces of the thin-film coil closer to the substrate;
   the coil facing portion of the cooling layer is located farther from the medium facing surface than the coil facing portion of the first pole layer; and
   the coil facing portion of the first pole layer is separated from the coil facing portion of the cooling layer with a gap,
   the thin-film magnetic head further comprising a first insulating portion made of an insulating material and disposed between the first pole layer and the thin-film coil, and a second insulating portion made of an insulating material and disposed between the cooling layer and the thin-film coil, wherein the first insulating portion is thicker than the second insulating portion.

2. A thin-film magnetic head comprising:
   a medium facing surface that faces toward a recording medium;
   a first pole layer and a second pole layer including magnetic pole portions that are opposed to each other and located in regions of the pole layers on a side of the medium facing surface;
   a coupling section that is located away from the medium facing surface, includes at least one of a portion of the first pole layer and a portion of the second pole layer, and magnetically couples the first and second pole layers to each other;
   a gap layer provided between the pole portion of the first pole layer and the pole portion of the second pole layer;
   a thin-film coil wound around the coupling section, a part of the coil being disposed between the first and second pole layers and insulated from the first and second pole layers;
   a cooling layer for cooling the first pole layer and the thin-film coil; and
   a substrate, wherein:
   the first and second pole layers, the gap layer, the thin-film coil and the cooling layer are stacked on the substrate, and the first pole layer is located closer to the substrate than the second pole layer;
   the first pole layer and the cooling layer are made of an identical magnetic material;
   each of the first pole layer and the cooling layer has a coil facing portion that faces toward one of surfaces of the thin-film coil closer to the substrate;
   the coil facing portion of the cooling layer is located farther from the medium facing surface than the coil facing portion of the first pole layer; and
   the coil facing portion of the first pole layer is separated from the coil facing portion of the cooling layer with a gap,
   the thin-film magnetic head further comprising two connecting portions that are disposed on both sides of the thin-film coil and connect the first pole layer to the cooling layer, wherein the connecting portions are made of a magnetic material the same as the first pole layer and the cooling layer.

3. The thin-film magnetic head according to claim 2, further comprising an insulating layer disposed between the first pole layer and the cooling layer, wherein the first pole layer, the cooling layer, the connecting portions and the insulating layer have flattened top surfaces.

4. A thin-film magnetic head comprising:
   a medium facing surface that faces toward a recording medium;
   a first pole layer and a second pole layer including magnetic pole portions that are opposed to each other and located in regions of the pole layers on a side of the medium facing surface;
   a coupling section that is located away from the medium facing surface, includes at least one of a portion of the first pole layer and a portion of the second pole layer, and magnetically couples the first and second pole layers to each other;
   a gap layer provided between the pole portion of the first pole layer and the pole portion of the second pole layer;
   a thin-film coil wound around the coupling section, a part of the coil being disposed between the first and second pole layers and insulated from the first and second pole layers;
   a cooling layer for cooling the first pole layer and the thin-film coil; and
   a substrate, wherein:
   the first and second pole layers, the gap layer, the thin-film coil and the cooling layer are stacked on the substrate, and the first pole layer is located closer to the substrate than the second pole layer;
   the cooling layer has a thermal conductivity equal to or greater than a thermal conductivity of the first pole layer;
   each of the first pole layer and the cooling layer has a coil facing portion that faces toward one of surfaces of the thin-film coil closer to the substrate;
   the coil facing portion of the cooling layer is located farther from the medium facing surface than the coil facing portion of the first pole layer; and the coil facing portion of the first pole layer is separated from the coil facing portion of the cooling layer with a gap, the thin-film magnetic head further comprising a first insulating portion made of an insulating material and disposed between the first pole layer and the thin-film coil, and a second insulating portion made of an insulating material and disposed between the cooling layer and the thin-film coil, wherein the first insulating portion is thicker than the second insulating portion.

5. A thin-film magnetic head comprising:

a medium facing surface that faces toward a recording medium;

a first pole layer and a second pole layer including magnetic pole portions that are opposed to each other and located in regions of the pole layers on a side of the medium facing surface;

a coupling section that is located away from the medium facing surface, includes at least one of a portion of the first pole layer and a portion of the second pole layer, and magnetically couples the first and second pole layers to each other;

a gap layer provided between the pole portion of the first pole layer and the pole portion of the second pole layer;

a thin-film coil wound around the coupling section, a part of the coil being disposed between the first and second pole layers and insulated from the first and second pole layers;

a cooling layer for cooling the first pole layer and the thin-film coil; and a substrate, wherein:

the first and second pole layers, the gap layer, the thin-film coil and the cooling layer are stacked on the substrate, and the first pole layer is located closer to the substrate than the second pole layer;

the cooling layer has a thermal conductivity equal to or greater than a thermal conductivity of the first pole layer;

each of the first pole layer and the cooling layer has a coil facing portion that faces toward one of surfaces of the thin-film coil closer to the substrate;

the coil facing portion of the cooling layer is located farther from the medium facing surface than the coil facing portion of the first pole layer; and the coil facing portion of the first pole layer is separated from the coil facing portion of the cooling layer with a gap, the thin-film magnetic head further comprising two connecting portions that have a thermal conductivity equal to or greater than the thermal conductivity of the first pole layer and that are disposed on both sides of the thin-film coil and connect the first pole layer to the cooling layer.

6. The thin-film magnetic head according to claim 5, further comprising an insulating layer disposed between the first pole layer and the cooling layer, wherein the first pole layer, the cooling layer, the connecting portions and the insulating layer have flattened top surfaces.

* * * * *